US00RE50448E

(19) United States
(12) Reissued Patent
Ogston et al.

(10) Patent Number: US RE50,448 E
(45) Date of Reissued Patent: Jun. 3, 2025

(54) METHOD AND APPARATUS FOR DETERMINING THE LOCATION OF A STATIC OBJECT

(71) Applicant: Hexagon Technology Center GmbH, Heerbrugg (CH)

(72) Inventors: Christopher G. Ogston, Calgary (CA); Guido Hufer, Rommerskirchen (DE); Charles Carlton Barnes, Huntsville, AL (US)

(73) Assignee: Hexagon Technology Center GmbH, Heerbrugg (CH)

(21) Appl. No.: 17/988,424

(22) Filed: Nov. 16, 2022

Related U.S. Patent Documents

Reissue of:
(64) Patent No.: 11,002,842
Issued: May 11, 2021
Appl. No.: 15/994,080
Filed: May 31, 2018

U.S. Applications:
(60) Provisional application No. 62/512,975, filed on May 31, 2017.

(51) Int. Cl.
*G01S 11/06* (2006.01)
*G01S 13/74* (2006.01)

(52) U.S. Cl.
CPC ..... *G01S 11/06* (2013.01); *G01S 13/74* (2013.01)

(58) Field of Classification Search
CPC ..... G01S 11/06; G01S 13/74; G01S 13/75; G01S 5/14
See application file for complete search history.

(56) References Cited

U.S. PATENT DOCUMENTS 11,002,842 B2 5/2021 Ogston et al.
2008/0032705 A1* 2/2008 Patel ..... H04L 65/104 455/456.1
2008/0143482 A1* 6/2008 Shoarinejad ..... G01S 13/878 340/10.1
2011/0156870 A1 6/2011 Attew
(Continued)

FOREIGN PATENT DOCUMENTS

CN 1867836 A 11/2006
CN 103308888 A 9/2013
(Continued)

OTHER PUBLICATIONS

Chinese Patent Office, Office Action for Application No. 201880049486.4, dated Dec. 21, 2022, 8 pages.
(Continued)

*Primary Examiner* — Mark Sager
(74) *Attorney, Agent, or Firm* — Nutter McClennen & Fish LLP

(57) ABSTRACT

A method and apparatus for determining the location of an object with a sensor positions an instrument at a first location, controls the instrument to transmit a first omnidirectional signal during a first time, and determines a first distance from the instrument to the static object using the first omnidirectional signal. The method and apparatus repeats this process in a serial manner at two other locations, and uses the respective distances from each location to determine the location of the object. Other embodiments are disclosed.

31 Claims, 12 Drawing Sheets

(56) References Cited

U.S. PATENT DOCUMENTS

| | | | | |
|---|---|---|---|---|
| 2013/0201003 | A1 | 8/2013 | Sabesan et al. | |
| 2015/0362581 | A1* | 12/2015 | Friedman | H04W 4/029 455/456.1 |
| 2016/0088440 | A1 | 3/2016 | Palanki et al. | |
| 2016/0092708 | A1* | 3/2016 | Burns | G01S 13/75 340/10.1 |

FOREIGN PATENT DOCUMENTS

| | | | |
|---|---|---|---|
| CN | 104181502 | A | 12/2014 |
| KR | 1020090003365 | A | 1/2009 |
| KR | 1020110064984 | A | 6/2011 |
| KR | 1020120072391 | A | 7/2012 |
| KR | 101589269 | B1 | 1/2016 |

OTHER PUBLICATIONS

Chinese Patent Office, Search Report for Application No. 201880049486.4, dated Dec. 21, 2022, 3 pages.

European Patent Office, Office Action for Application No. 18732608.7, Feb. 25, 2022, 18 pages.

European Patent Office, Office Action for Application No. 18732608.7, Oct. 25, 2021, 4 pages.

European Patent Office, Response as filed for Application No. 18732608.7, Jul. 9, 2020, 15 pages.

European Patent Office, Search Opinion Communication pursuant to Rules 161(c) and 162 EPC for Application No. 18732608.7, Jan. 10, 2020, 3 pages.

International Preliminary Report on Patentability for Application No. PCT/US2018/035319 mailed Dec. 12, 2019. 12 pages.

International Preliminary Report on Patentability for Application No. PCT/US2018/035319 mailed Dec. 3, 2019, 9 pages.

International Search Report and Written Opinion for Application No. PCT/US2018/035319 mailed Sep. 12, 2018. 16 pages.

Korean Intellectual Property Office, Notice for Grounds for Rejection of Application No. 10-2019-7038251, dated Oct. 22, 2021,3 pages.

Korean Intellectual Property Office, Notice of Allowance for Application No. 10-2019-7038251, dated Apr. 6, 2022, 4 pages.

Korean Intellectual Property Office, Response for Application No. 10-2019-7038251, dated Dec. 17, 2021, 12 pages.

Korean Intellectual Property Office, Response to Office Action for Application No. 10-2019-7038251, dated Jun. 7, 2021, 65 pages.

* cited by examiner

METHOD AND APPARATUS FOR DETERMINING THE LOCATION OF A STATIC OBJECT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This patent application *is a reissue of U.S. Pat. No. 11,002,842 issued May 11, 2021 corresponding to U.S. patent application Ser. No. 15/994,080 filed May 31, 2018, which* claims the benefit of U.S. Provisional Patent Application No. 62/512,975 entitled METHOD AND APPARATUS FOR DETERMINING THE LOCATION OF A STATIC OBJECT filed on May 31, 2017, *each of* which is hereby incorporated herein by reference in its entirety.

FIELD OF THE INVENTION

The invention generally relates to object location and, more particularly, the invention relates to locating static objects.

BACKGROUND OF THE INVENTION

Large area spaces often are used to store equipment and other objects. For example, a storage area for a large construction site (e.g., a municipal project, such as a power plant) can have many thousands of objects that are required to build the power plant. Among other things, those objects can be sophisticated electronics, wood, bags of concrete, wiring, piping, tools, equipment, trucks, etc.

Keeping track of the inventory at many large sites, however, often presents a significant challenge. For example, finding a prescribed object in a storage area spanning several acres can be daunting and take a lot of time. One common method for finding a prescribed object may involve simply using a picture of the large site. Undesirably, the picture may not have the requisite resolution, making it hard to read. This undesirably wastes time and possibly causes the person looking for the object not to find that object. In the latter case, more costs may be incurred to re-acquire the "missing" object.

SUMMARY OF VARIOUS EMBODIMENTS

In accordance with one embodiment of the invention, a method of determining the location of a static object with a sensor positions an instrument at a first location, controls the instrument to transmit a first omnidirectional signal during a first time, and determines a first distance from the instrument to the static object using the first omnidirectional signal.

The method then changes the position of the instrument to a second location, controls the instrument to transmit a second omnidirectional signal during a second time, and determines a second distance from the instrument to the static object using the second omnidirectional signal.

Next, the method again changes the position of the instrument—to a third location, controls the instrument to transmit a third omnidirectional signal during a third time, and then determines a third distance from the instrument to the static object using the third omnidirectional signal.

The first time is before the second time, and the second time is before the third time. Thus, this is a serial method. Finally, the method uses the first, second and third distances to determine the location of the static object.

The method may use trilateration techniques to determine the location of the static object. Moreover, among other things, the instrument may be a mobile device. For example, the mobile device may be a portable computer, tablet, or smartphone.

Those skilled in the art may select an appropriate sensor for the task. For example, the sensor may include an RFID sensor.

Indeed, the first, second and third locations are spaced apart, different locations. In a corresponding manner, the first, second, and third times are start times and different times. The three times form a serial process. Some embodiments may move the instrument to a fourth location, control the instrument to transmit a fourth omnidirectional signal during a fourth time, and then determine a fourth distance from the instrument to the static object using the fourth omnidirectional signal and two of the first, second, and third signals.

In accordance with another embodiment, a method of determining the location of an object including a sensor comprises controlling an instrument to make a plurality of successive readings at different locations, wherein, for each reading location, the instrument receives a signal from the sensor and makes a characterization of the received signal using at least one of (a) a receive signal strength of the received signal or (b) a response time of the received signal; and determining location of the object based on the characterizations from the readings made at the different locations.

In one alternative embodiment, controlling the instrument to make the plurality of successive readings at the different locations may involve positioning the instrument at a first location; controlling the instrument to transmit a first omnidirectional signal during a first time; making a first characterization for a first signal received from the sensor at the first location; changing the position of the instrument to a second location; controlling the instrument to transmit a second omnidirectional signal during a second time; making a second characterization for a second signal received from the sensor at the second location; changing the position of the instrument to a third location; controlling the instrument to transmit a third omnidirectional signal during a third time; and making a third characterization for a third signal received from the sensor at the third location, where the first time is before the second time, and the second time is before the third time.

In other alternative embodiments, determining the location of the object based on the characterizations from the readings made at the different locations may involve determining, for each reading location, a distance from the instrument to the object based on the characterization of the received signal from the reading at said reading location; and determining location of the object based on the distances determined from the readings made at the different locations. Determining the location of the object based on the distances determined from the readings made at the different locations may involve determining, for each reading location, a circle centered at the reading location and having a radius equal to the distance determined from the reading at said reading location; and determining the location of the object based on an intersection of the circles.

In yet other alternative embodiments, determining the location of the object based on the characterizations from the readings made at the different locations may involve determining, for each reading location, a circle centered at the reading location and having a radius equal to a maximum effective distance within which the sensor can be detected by the instrument; and determining a candidate area for the location of the object based on an intersection of the circles. A point within the candidate area may be determined based on relative receive signal strength measurements from a plurality of reading locations.

In any of the above-described embodiments, determining the location of the object based on the receive signal strengths determined from the readings made at the different locations may involve using trilateration techniques to determine the location of the object. The instrument may be a mobile device, such as, for example, a portable computer, tablet, or smartphone. The instrument may be on a movable platform, in which case controlling the instrument to make a plurality of successive readings at a plurality of different locations may involve controlling the movable platform to move to the plurality of locations. The sensor may be an RFID sensor or other type of sensor. Distances may be based receive signal strength and/or response time of a received signal. Controlling the instrument to make the plurality of successive readings may involve determining whether a sufficient number of readings have been taken for satisfactory location of the object; and upon determining that one or more additional readings are needed, controlling the instrument to make at least one additional reading, each such additional reading being at a different location than prior readings. Determining whether a sufficient number of readings have been taken for satisfactory location of the object may involve determining, for each reading location, a circle centered at the reading location and having a radius equal to a distance determined from the reading at said reading location; and determining whether intersection of the circles identifies a satisfactory location of the object. The plurality of successive readings may include a first reading made at a first location, the first reading resulting in a first circle within which the object will be found; and a second reading made after the first reading at a location within the first circle, the second reading resulting in a second circle that intersects with the first circle substantially at the location of the object.

In accordance with another embodiment, an instrument for determining the location of an object including a sensor comprises a wireless transceiver and a computer system including a processor and memory storing program code that, when executed by the processor, causes the processor to perform computer processes comprising making a plurality of successive readings at different locations, wherein, for each reading location, the processor receives a signal from the sensor via the wireless transceiver and makes a characterization of the received signal using at least one of (a) a receive signal strength of the received signal or (b) a response time of the received signal; and determining location of the object based on the characterizations from the readings made at the different locations.

In various alternative embodiments, making the plurality of successive readings at the different locations may involve transmitting a detection signal at each of the different locations via the wireless transceiver and/or determining and recording location information for the instrument at each different location. Determining the location of the object based on the characterizations from the readings made at the different locations may involve determining the location of the object based on the characterizations from the readings made at the different locations and the location information.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a method and apparatus locate an object using serially transmitted detection signals from multiple different locations. Accordingly, unlike conventional trilateration techniques, illustrative embodiments do not require simultaneous signals from the multiple different locations. As such, only a single transmitting device is required to accomplish the results formerly required of multiple devices. Details of various embodiments are discussed below.

Figure 1:
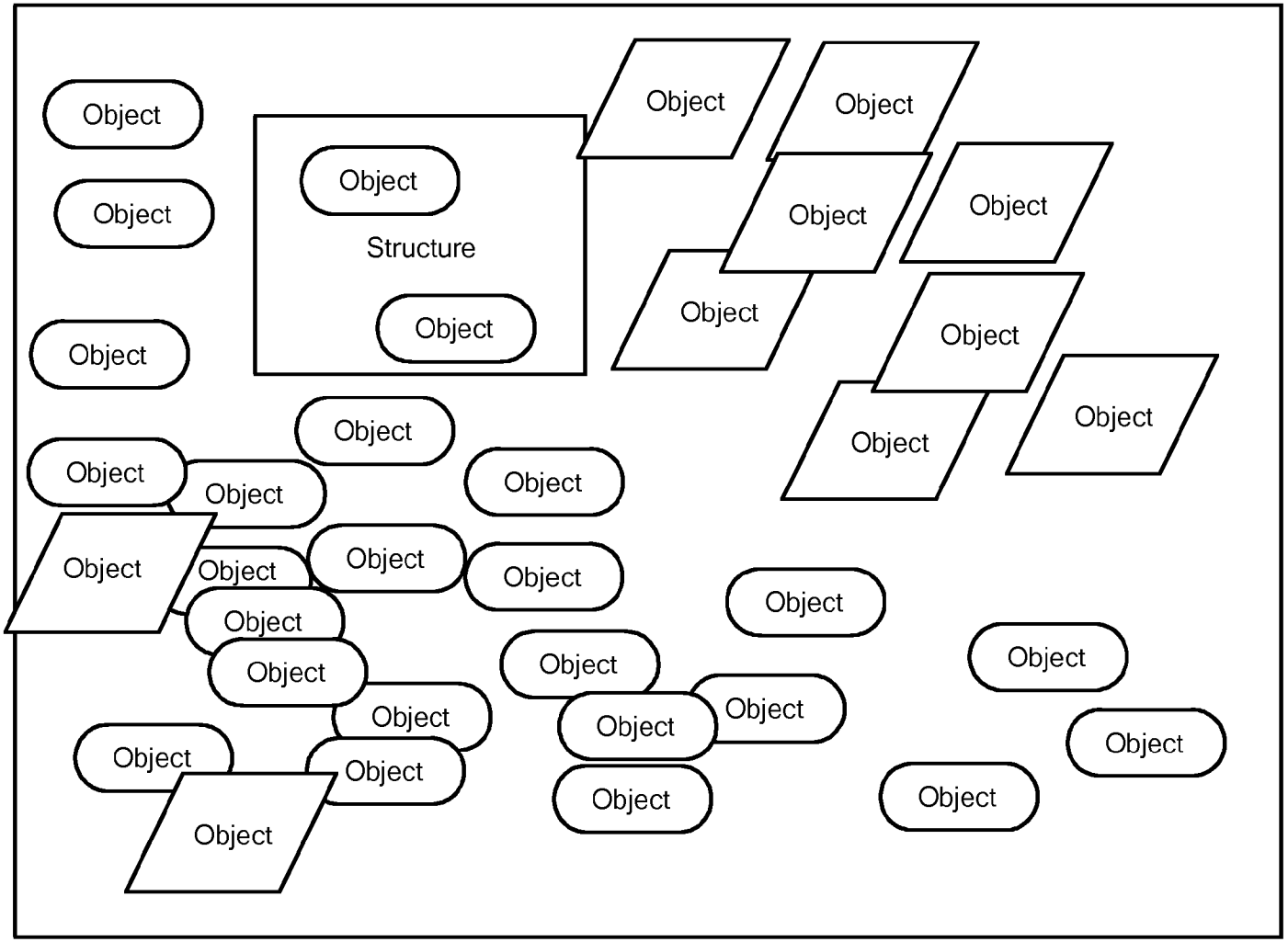
FIG. 1 schematically shows an exemplary lot with a plurality of objects that may be used with illustrative embodiments of the invention.

FIG. 1 schematically shows a storage area or storage lot that may be used with illustrative embodiments of the invention. As shown, the storage area stores a plurality of objects, which are shown schematically as different shapes. Among other things, each shape indicated as "Object" in FIG. 1 may represent one object, or a plurality of objects (e.g., a pallet of objects). Some objects may overlap each other or even have a portion that extends off the storage area.

In illustrative embodiments, the storage area is an outdoor storage lot for storing materials for building a large scale municipal project, such as a roadway, bridge, ship, or power plant. As such, the storage lot may cover many acres or square miles and have thousands of objects. As shown, the objects may include materials and objects used to build the ultimate item. If building a power plant, for example, the lot may store a wide variety of pipes, bags of concrete, tractors, vehicles, electrical equipment, boilers, wood, scaffolding, power tools, etc. Some or all of the objects preferably have a tag, sensor, or similar device that can be located by a remote instrument. For simplicity, each of those devices is referred to as "sensors."

Among other things, the sensor may be an active device or a passive device. For example, the sensor may be a passive RFID tag. In that case, the sensor includes a tag that collects energy from a nearby RFID reader/instrument transmitting radio waves. Their relatively small size (e.g., on the order of the size of a piece or rice) and relatively low cost makes them well suited to track a wide variety of objects in the storage lot. As another example, the sensor may be an active RFID tag, which actively transmits a signal intended to be read by a remote instrument (e.g., a portable device, such as a laptop, tablet, or smartphone). As such, the active RFID tag has its own power source (e.g., a battery) and typically can be detected relatively far from the object itself. In illustrative embodiments, the active RFID tag can transmit an omnidirectional signal that has a radius of at least the longest dimension of the storage area. Some active RFID embodiments, however, may not have such range.

It should be noted that RFID is discussed as an example and is not intended to limit illustrative embodiments. Accordingly, other transmission/location technologies may be used and still be within the scope of various embodiments. Thus, for example, sensors employing technologies such as Bluetooth Low Energy (BLE), RuBee, or other technologies may be used. Furthermore, objects having different types of sensors may be present.

In addition to objects, the storage lot may include structures. For example, the storage lot may include a shed to store objects. It should be noted that discussion of the storage lot for a large scale municipal project is but one of a variety of uses for illustrative embodiments. Accordingly, those skilled in the art may use various embodiments in other environments.

As noted above, it may be difficult to find specific objects in such a large lot. Prior art methods known by the inventors often used maps or pictures to locate objects. While helpful, those methods are not efficient and often are hard to follow. To overcome this problem, the inventor initially recognized that a person searching for a specific object could use trilateration techniques to locate the object of interest. Those skilled in the art often use these techniques to locate an object using the global positioning system (GPS).

To use trilateration techniques, a user sets up three different instruments, in three different locations, and causes them to transmit (and/or receive as the case may be) a signal at the same time in the search for the object of interest. After further testing and analysis, however, the inventor discovered that such a technique is expensive, cumbersome, and impractical in this circumstance.

Specifically, many large lots in this application are far from settled areas, lack infrastructure, and/or simply large in scale. Using three separate, expensive devices to send signals often is impractical. Moreover, ensuring simultaneous transmission also is clumsy and difficult in practice in this application. To overcome this latter problem, the inventor subsequently recognized that the nature of certain storage lots did not require three geographically spaced instruments timed to simultaneously transmit or receive signals.

The inventor also recognized that many of the objects of interest simply are placed in the storage area and not moved until they are used. In other words, many of the objects are static—they do not move regularly. However, some objects may be moved into, out of, or within the storage area. For example, a fork lift may be left in different locations within the storage area, and materials may be moved from time to time, such as when materials are used or reorganized or to make room for storage of additional materials.

The inventor thus discovered that only one instrument was necessary rather than three instruments. More specifically, the inventor recognized that a user can borrow from conventional trilateration techniques, but still use a single instrument. To that end, the inventor discovered that the user can take readings/measurements at different locations at different times—in series and not in parallel (simultaneously)—and determine the location of the object based on the readings.

Figure 2:
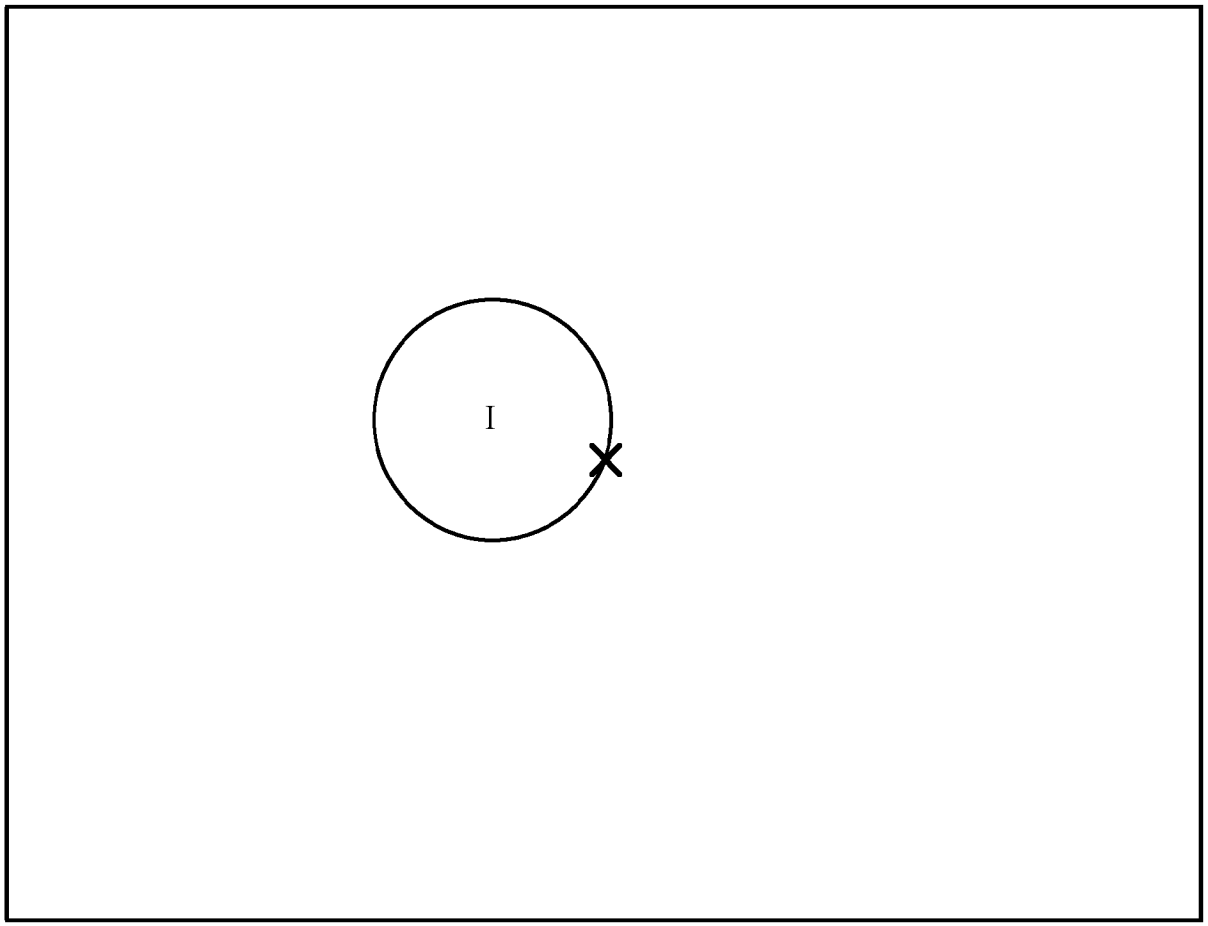
FIG. 2 schematically shows another exemplary lot demonstrating an instrument determining its distance from a given object at a first time.
Figure 3:
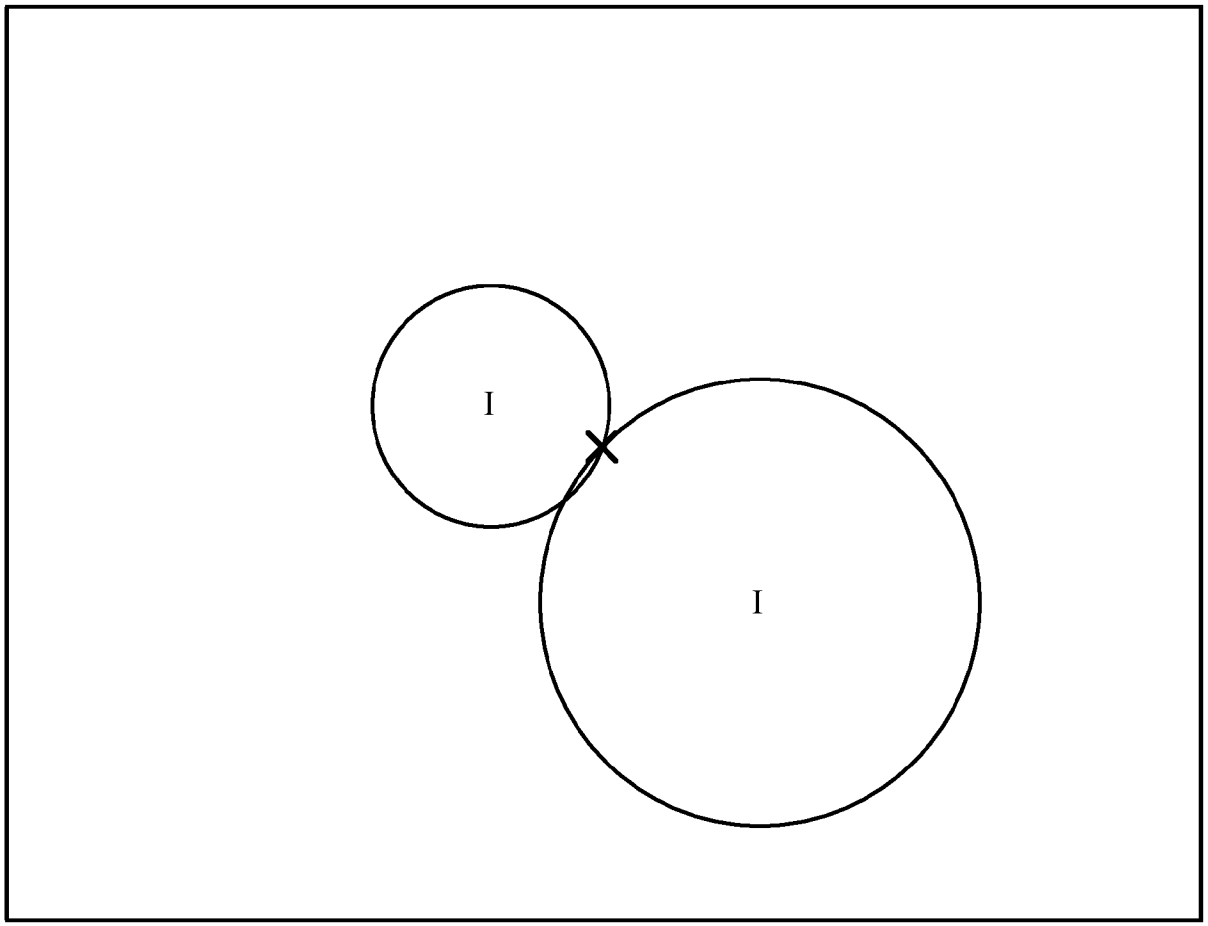
FIG. 3 schematically shows the exemplary lot of FIG. 2 demonstrating the instrument determining its distance from the same given object at a second time.
Figure 4:
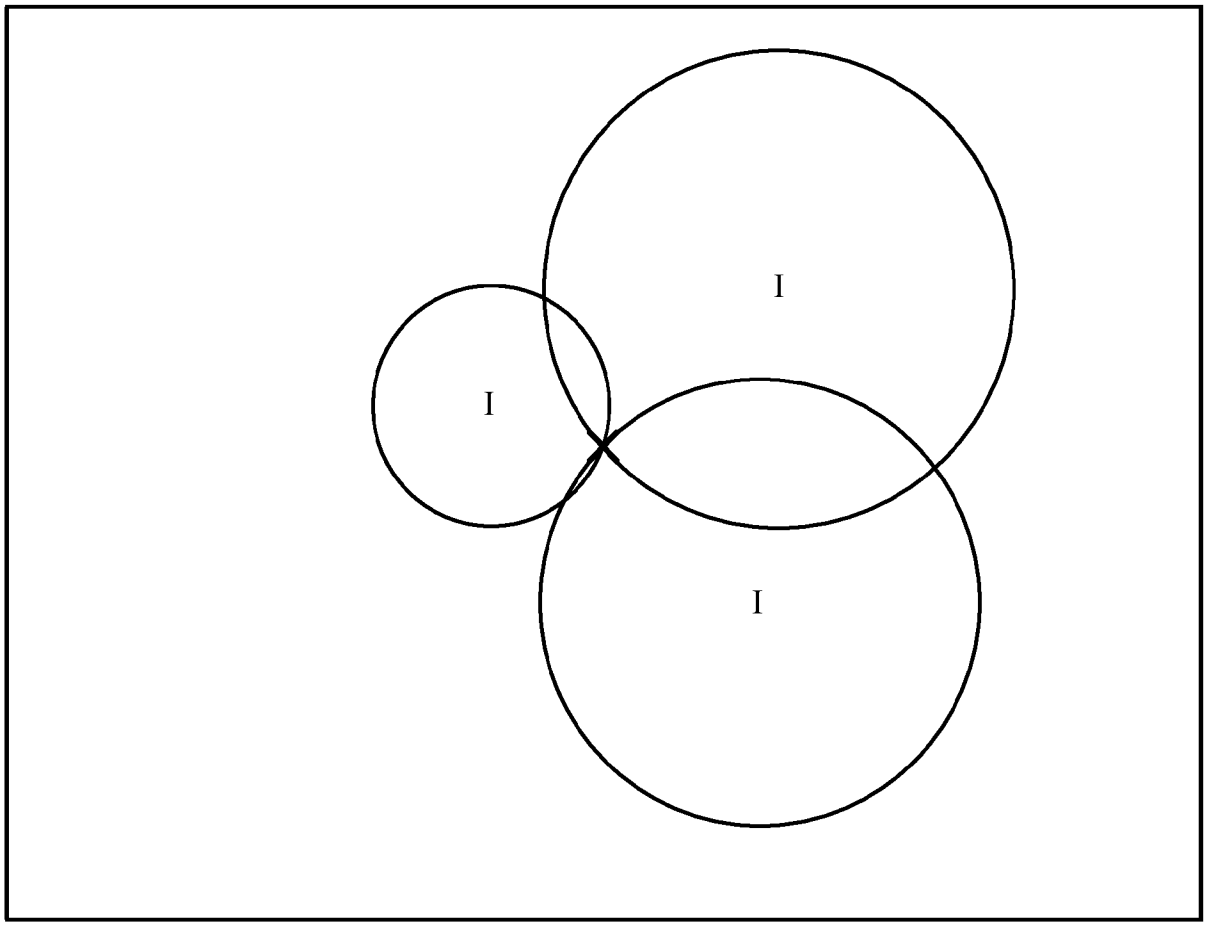
FIG. 4 schematically shows the exemplary lot of FIGS. 2 and 3 demonstrating the instrument determining its distance from the same given object at a third time.

FIGS. 2-4 schematically show one example of how this process may be performed. Specifically, in FIGS. 2-4, the instrument is identified by a box having an "I" inside it. As noted above, this instrument preferably is a portable instrument that may be commonly used by people on a storage lot, such as a tablet, smartphone, or laptop computer. Other embodiments, however, may include mobile devices on a vehicular platform or other mobile platform (e.g., a computer that is part of a piece of mobile equipment that can move within the storage area such as a truck or automobile, fork lift, scooter, remote controlled vehicle, autonomous vehicle, or drone). The object is identified by an "X."

Figure 5:
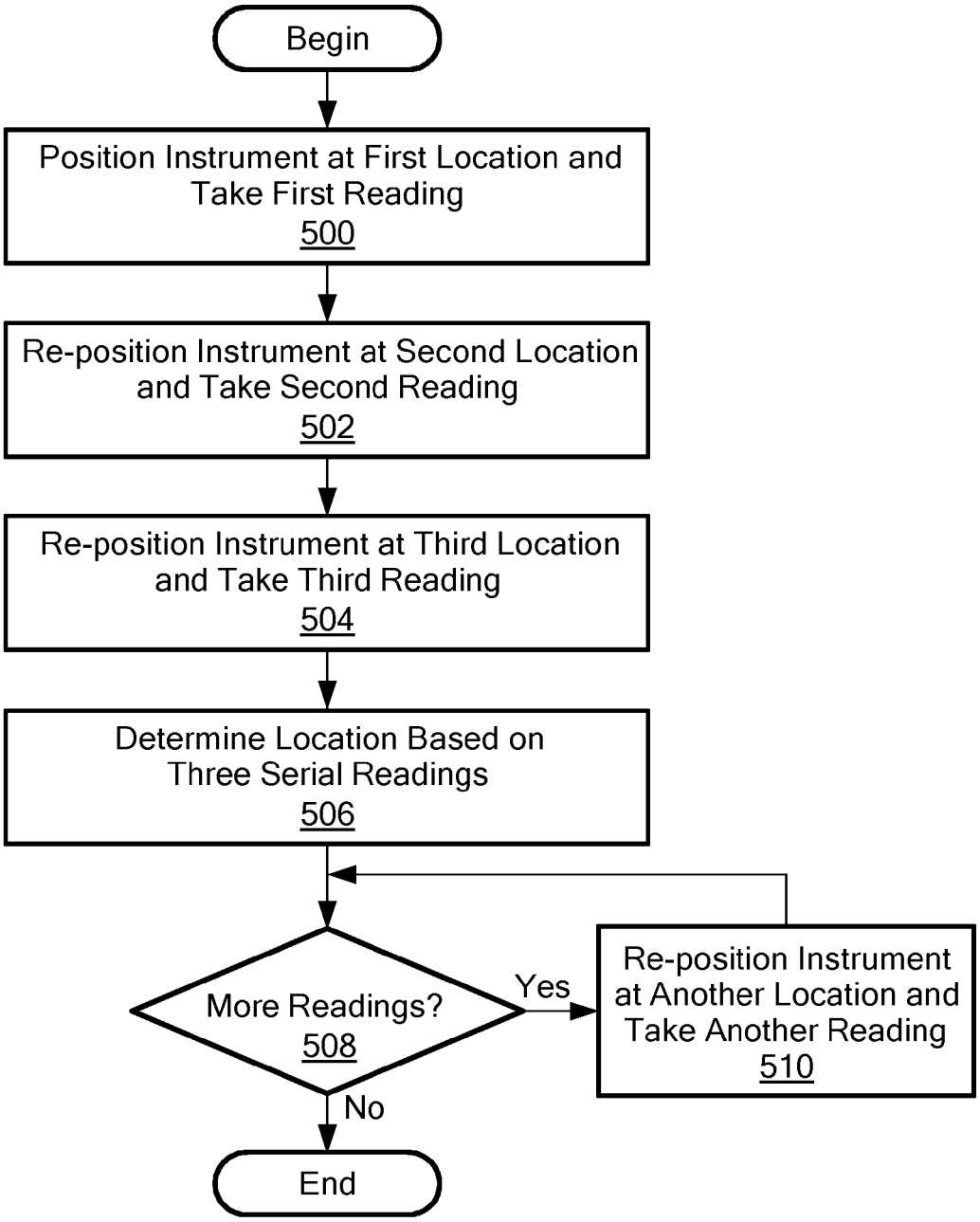
FIG. 5 shows a process of locating the given object as shown in FIGS. 2-4 in accordance with illustrative embodiments of the invention.

FIG. 5 shows a process of locating the object as shown in FIGS. 2-4. It should be noted that this process is substantially simplified from a longer process that may be used to locate the object. Accordingly, the process can have additional steps that those skilled in the art likely would use. In addition, some of the steps may be performed in a different order than that shown, or at the same time. Those skilled in the art therefore can modify the process as appropriate.

The process of FIG. 5 begins at step 500. Specifically, at time 1 (FIG. 2), the instrument emits an omnidirectional detection signal (sometimes referred to as an interrogation or advertisement signal) from a first location and receives a return signal from the sensor associated with the object (e.g., a reflected signal from a passive RFID sensor or an actively transmitted signal from an active RFID or BLE sensor). The instrument thus forms a "first circle" having a radius that is equal to the distance from the instrument to the object. A known equation using the signal strength/power received by the instrument provides the approximate radius and thus, the approximate distance between the object and the instrument. For example, with RFID, the signal detected by the instrument is decoded in hardware to determine both a RFID serial number and a receive signal strength indicator (RSSI). The RSSI, which typically is in a range of −100 to 0, is a function of the power of the detected signal. Logic uses the known equation to convert the RSSI into a distance/radius. Distance may be measured or estimated using additional and/or alternative information associated with the detected signal, such as, for example, the response time between transmission of the detection signal and receipt of the return signal from the sensor.

As known by those in the art, the object thus is somewhere along the outline/circumference of the first circle. When using an RFID system, the instrument ensures it is locating the appropriate object, which has the desired RFID—permitting identification of the object. Thus, the RFID should be available to the instrument prior to or while emitting the signal. Note that some embodiments may simply receive a signal from the object with the RFID. In some situations, the instrument may receive return signals from multiple sensors in response to the detection signal and may determine, for each sensor, a distance from the instrument to the sensor based on the RSSI of the return signal and/or other information.

The process repeats much of step 500 at another location. Specifically, at time 2 (FIG. 3), which is later than time 1, the instrument emits another omnidirectional detection signal from a second, different location. The instrument thus forms a "second circle" having a radius that is equal to the distance from the instrument to the object. Since the object also is positioned somewhere along the outline/circumference of the second circle, then the object necessarily is located at one of the two intersection points of the two circles. At this point, however, the location still is not necessarily known because the object is in one of two locations.

The process continues to step 504 to again repeat some of step 500. Specifically, at time 3 (FIG. 4), which is later than time 1 and time 2, the instrument emits a third omnidirectional detection signal from a third, different location. The instrument thus forms a "third circle" having a radius that is equal to the distance from the instrument to the object. Since the object also is along the outline/circumference of the third circle, the object necessarily is located at the single intersection point of the three circles.

Next, at step 506, the method determines the location of the object, which is at the intersection of these three circles. Sometimes, however, there may be interference, or one or more of the three circles does not produce an accurate result (e.g., the three circles do not meet at a point or the area of overlap of the three circles is not within a predetermined acceptable size range). Also, one or more readings may be taken outside of the range of the sensor (e.g., the first reading might detect the sensor but the second or third reading might fail to detect the sensor). In that case, the location of the object may not be clear. The process thus decides at step 508 if more readings are necessary. If so, then the method may reposition the instrument at another location to take another reading (step 510). As with steps 500, 502, and 504, this is at a later time than the other previous times. This repeats, if necessary, until a satisfactory location is determined. Accordingly, fourth, fifth, sixth, etc. readings may be taken to achieve a satisfactory result.

In some embodiments, a FIFO buffer with three locations may store the circle data of three different times. In other embodiments, a longer buffer or other storage medium may be used and form a point cloud of the different potential locations. A centroid of the point cloud could designate the approximate location of the object.

Below is sample pseudocode that may illustrate various embodiments of the invention:

```
//core entity
trilaterationRecord: {
    rfidSerialNumber,
    currentLocation: {latitude, longitude},
    circle1: {origin: {latitude, longitude},
radiusToRfidTag, timestamp},
    circle2: {origin: {latitude, longitude},
radiusToRfidTag, timestamp},
    circle3: {origin: {latitude, longitude},
radiusToRfidTag, timestamp}
};
//pseudo code with the algorithm
record timestamp, RFID serial number, signal strength,
and the instrumentPosition (lat / lng);
convert signal strength into approximate distance;
find trilaterationRecord by rfidSerialNumber;
replace circle[x] with radiusToRfidTag=distance,
origin=instrumentPosition, where circle[x] is null or is
the oldest timestamp of all circle[ ];
apply standard trilateration algorithm to set
trilaterialRecord.currentLocation;
```

In some situations, it may be possible, at least theoretically, to locate an object using only two readings, specifically by taking the second reading within the area determined from the first reading. Assuming the distance measurements are relatively precise, the circle produced at the second measurement location will intersect with the circle produced at the first location substantially at a single point X, indicating the approximately location of the object.

Figure 6:
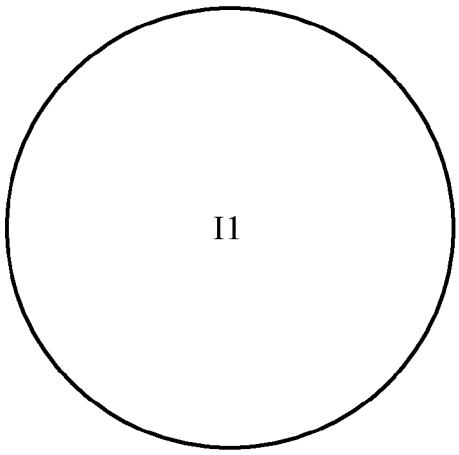
FIG. 6 is a schematic diagram showing a representation of a first measurement taken at a first location I1, resulting in a "first circle" having a radius that is equal to the distance from the instrument at location I1 to the object as determined from a first signal received from the object, in accordance with an exemplary embodiment.

FIG. 6 is a schematic diagram showing a representation of a first measurement taken at a first location I1, resulting in a "first circle" having a radius that is equal to the distance from the instrument at location I1 to the object as determined from a first signal received from the object, in accordance with an exemplary embodiment. The location of the object is still unknown.

Figure 7:
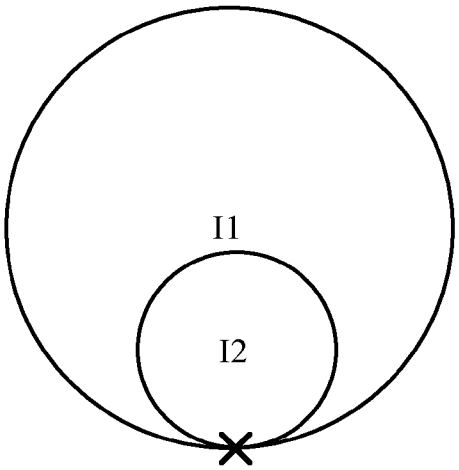
FIG. 7 is a schematic diagram showing a representation of a second measurement taken at a second location within the first circle that is closer to the object, in accordance with an exemplary embodiment.

FIG. 7 is a schematic diagram showing a representation of a second measurement taken at a second location within the first circle that is closer to the object, in accordance with an exemplary embodiment. Specifically, a second measurement is taken at a location I2, resulting in a "second circle" having a radius that is equal to the distance from the instrument at location I2 within the first circle to the object. In this example, the second location I2 is closer to the object than the first location I1. Thus, generally speaking, the RSSI of the signal received at second location I2 would be greater than the RSSI of the signal received at first location I1, indicating that the object is closer to location I2 than to location I1, and hence the radius of the second circle is smaller than the radius of the first circle. Assuming the distance measurements are relatively precise, the first circle and the second circle will meet substantially at a single point X, indicating the approximately location of the object.

Figure 8:
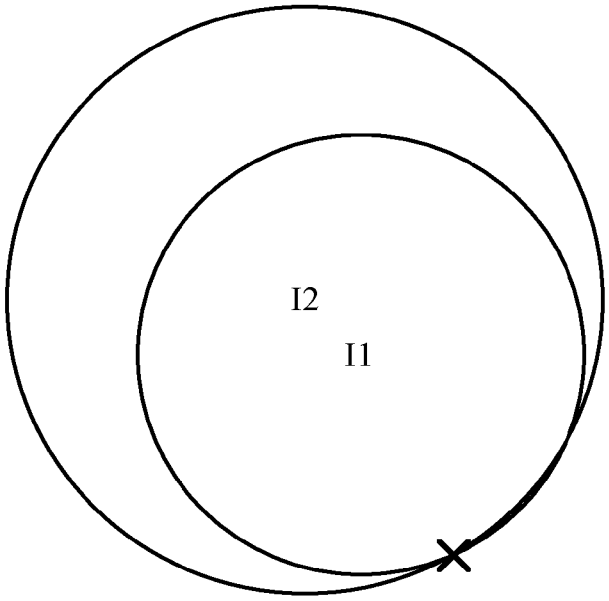
FIG. 8 is a schematic diagram showing a representation of a second measurement taken at a second location within the first circle that is further from the object, in accordance with an exemplary embodiment.

FIG. 8 is a schematic diagram showing a representation of a second measurement taken at a second location within the first circle that is further from the object, in accordance with an exemplary embodiment. Specifically, a second measurement is taken at a location I2, resulting in a "second circle" having a radius that is equal to the distance from the instrument at location I2 within the first circle to the object. In this example, the second location I2 is further from the object than the first location I1. Thus, generally speaking, the RSSI of the signal received at second location I2 would be less than the RSSI of the signal received at first location I1, indicating that the object is further from location I2 than from location I1, and hence the radius of the second circle is larger than the radius of the first circle. Assuming the distance measurements are precise, the first circle and the second circle will meet substantially at a single point X, indicating the approximately location of the object.

In some situations, it may be difficult to accurately measure the distance from the instrument to the object based on the signal received by the instrument. For example, when passive RFID sensors are used, the strength of the signal transmitted by the sensor is generally proportional to the strength of the signal received by the sensor (e.g., the signal transmitted by the sensor may be a reflection of the received signal). However, there may be a maximum effective distance within which the sensor can be detected by the instrument. Thus, when the instrument transmits an interrogation signal and receives a response signal from the sensor, it can be assumed that the sensor is within the maximum effective distance from the instrument, and when the instrument transmits an interrogation signal and fails to receive a response signal from the sensor, it can be assumed that the sensor is outside of the maximum effective distance from the instrument. These characteristics can be used to identify a target area within which the object can be found. For example, one or more measurements can be taken to find a first location at which the sensor is detected, thereby producing a first circle identifying a target area within which the object can be found. Then, one or more additional measurements can be taken to successively reduce the target area, for example, until the target area is sufficiently small to identify the location of the object. Each successive location can be selected such that the area of a circle centered at location of the measurement will overlap with the previously identified target area and further can be selected such that a circle centered at the measurement location will overlap with approximately half of the previously identified target area such that the measurement will effectively reduce the target area by half. Additionally or alternatively, the location of the object within a given target area can be further refined based on relative RSSI measurements.

Figure 9:
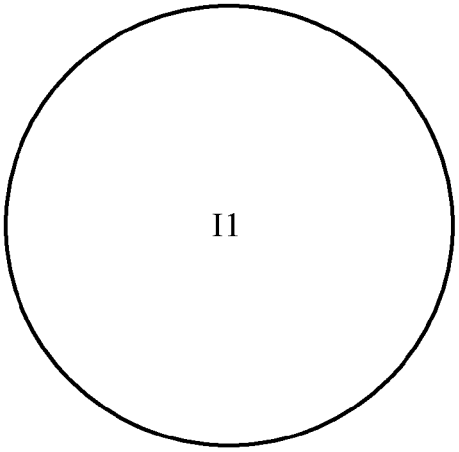
FIG. 9 is a schematic diagram showing a representation of a first measurement taken at a first location I1, resulting in a "first circle" having a radius that is equal to the maximum effective distance within which the sensor can be detected by the instrument, in accordance with an exemplary embodiment.

FIG. 9 is a schematic diagram showing a representation of a first measurement taken at a first location I1, resulting in a "first circle" having a radius that is equal to the maximum effective distance within which the sensor can be detected by the instrument, in accordance with an exemplary embodiment. For purposes of this example, it is assumed that the sensor is detected during the first measurement taken at location I1. Thus, this first circle represents an initial target area within which the object can be found.

Figure 10:
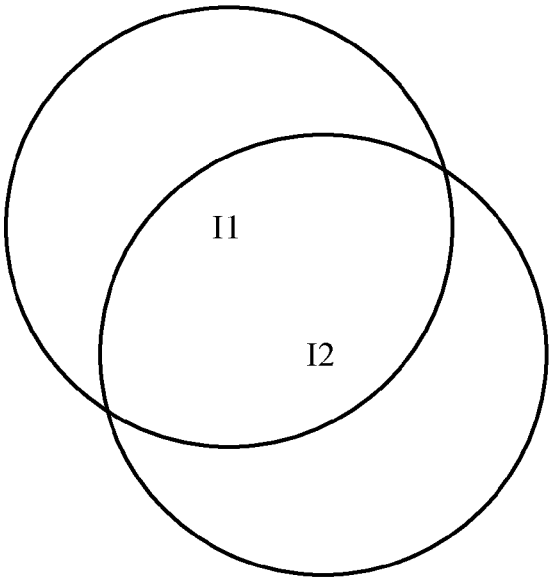
FIG. 10 is a schematic diagram showing a representation of a second measurement taken at a second location I2, resulting in a "second circle" having a radius that is equal to the maximum effective distance within which the sensor can be detected by the instrument, in accordance with an exemplary embodiment.

FIG. 10 is a schematic diagram showing a representation of a second measurement taken at a second location I2, resulting in a "second circle" having a radius that is equal to the maximum effective distance within which the sensor can be detected by the instrument, in accordance with an exemplary embodiment. For purposes of this example, it is assumed that the sensor is detected during the second measurement taken at location I2. Thus, it can be determined that the sensor is within the area overlapped by the first and second circles. If the sensor had not been detected during the second measurement taken at location I2, then it could be determined that the sensor is within the area of the first circle not overlapped by the second circle. By selecting the location I2 such that the second circle overlaps approximately half of the first circle, the target area essentially can be reduced by half.

Figure 11:
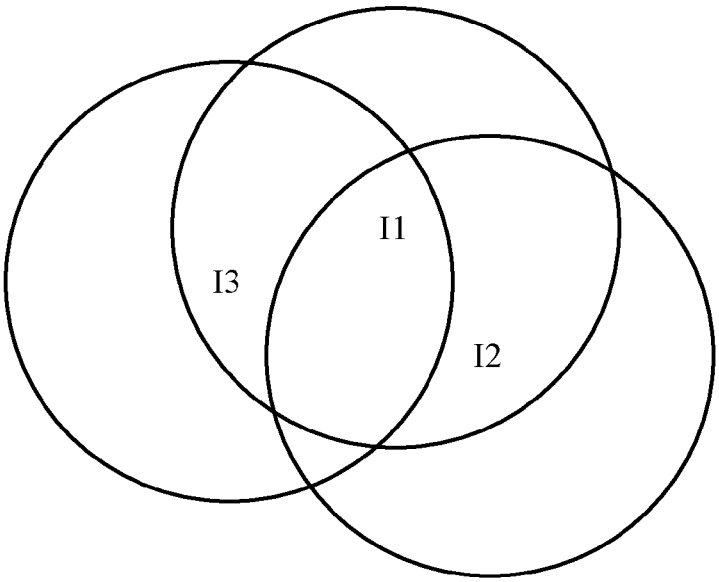
FIG. 11 is a schematic diagram showing a representation of a third measurement taken at a third location I3, resulting in a "third circle" having a radius that is equal to the maximum effective distance within which the sensor can be detected by the instrument, in accordance with an exemplary embodiment.

FIG. 11 is a schematic diagram showing a representation of a third measurement taken at a third location I3, resulting in a "third circle" having a radius that is equal to the maximum effective distance within which the sensor can be detected by the instrument, in accordance with an exemplary embodiment. For purposes of this example, it is assumed that the sensor is detected during the third measurement taken at location I3. Thus, it can be determined that the sensor is within the area overlapped by the first, second, and third circles, as shown by the highlighted area in FIG. 12, which represents a zone of ambiguity with respect to the possible location of the object in accordance with the embodiments described with reference to FIGS. 9-11. If the sensor had not been detected during the third measurement taken at location I3, then it could be determined that the sensor is within the area overlapped by the first and second circles but outside of the third circle. By selecting the location I3 such that the third circle overlaps approximately half of the previous target area, the target area essentially can be reduced by half.

Figure 12:
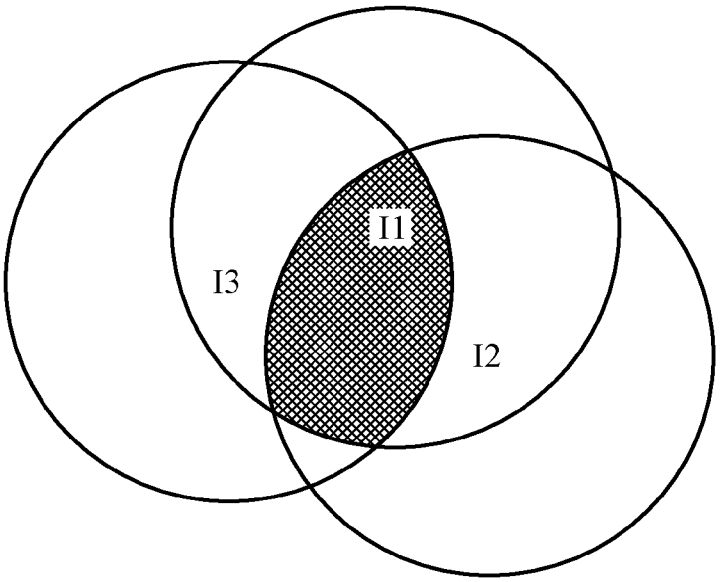
FIG. 12 is a schematic diagram highlighting a target zone representing a zone of ambiguity with respect to the possible location of the object in accordance with the embodiments described with reference to FIGS. 9-11.

Assuming the maximum effective distance is consistent at the three measurement locations, the object would be located within the target area overlapped by the three circles shown in FIG. 12. In some situations, this target area might be sufficient for locating the object, e.g., if the target area is small enough to provide an accurate location of the object.

Of course, additional measurements can be made in order to further reduce the target area. For example, a fourth measurement can be taken at a fourth location 14. The location 14 can be selected such that the area of a circle centered at location 14 will overlap with the highlighted target area and further can be selected such that a circle centered at location 14 will overlap with approximately half of the highlighted target area such that the fourth measurement will effectively reduce the target area by half.

Figure 13:
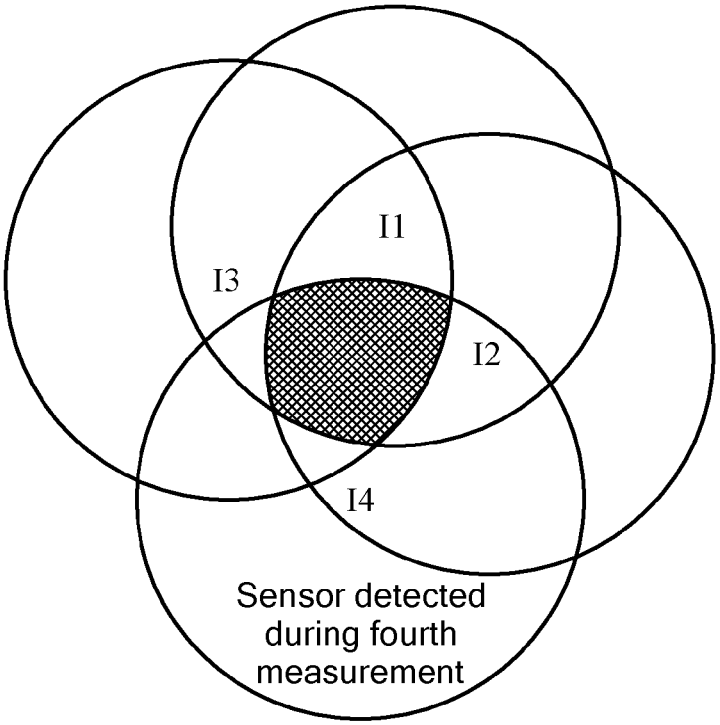
FIG. 13 is a schematic diagram highlighting a first reduced zone of ambiguity with respect to the possible location of the object represented by a fourth measurement in accordance with the embodiments described with reference to FIG. 12.

FIG. 13 is a schematic diagram highlighting a first reduced zone of ambiguity with respect to the possible location of the object represented by a fourth measurement in accordance with the embodiments described with reference to FIG. 12. In this example, the sensor was detected during the fourth measurement such that the target area is now the area overlapped by all four circles.

Figure 14:
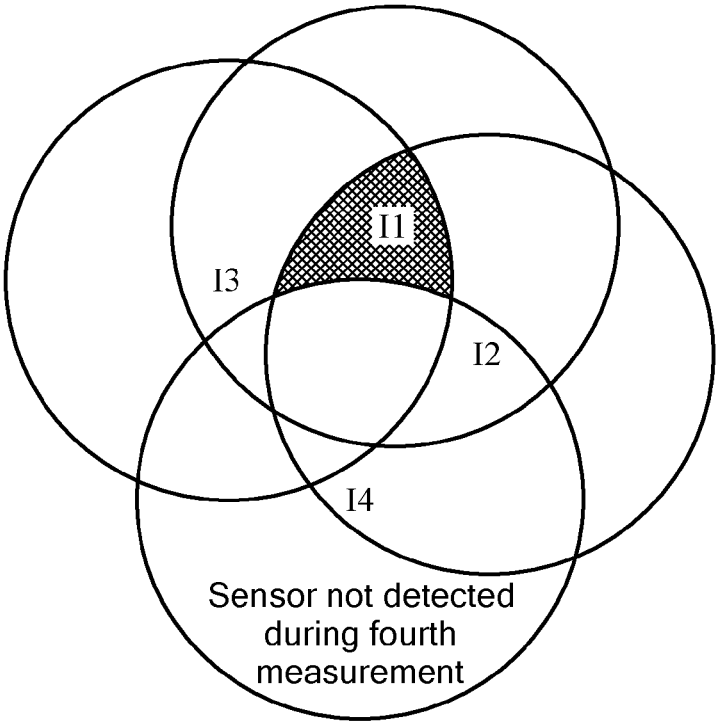
FIG. 14 is a schematic diagram highlighting a second reduced zone of ambiguity with respect to the possible location of the object represented by a fourth measurement in accordance with the embodiments described with reference to FIG. 12.

FIG. 14 is a schematic diagram highlighting a second reduced zone of ambiguity with respect to the possible location of the object represented by a fourth measurement in accordance with the embodiments described with reference to FIG. 12. In this example, the sensor was not detected during the fourth measurement such that the target area is now the area overlapped by the first, second, and third circles outside of the fourth circle.

Figure 15:
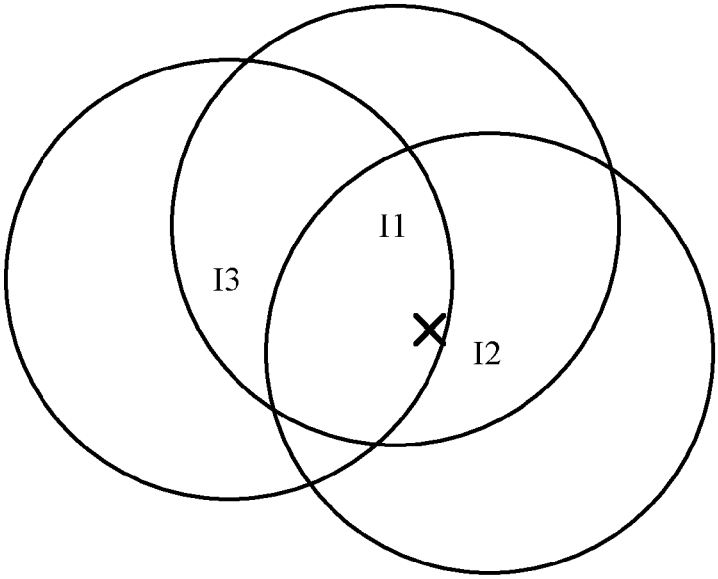
FIG. 15 is a schematic diagram showing a representation of the possible location of the object in accordance with the embodiments described with reference to FIGS. 9-11.

Additionally or alternatively, in some situations, a point within the target area can be determined based on the relative RSSI measurements from locations I1, I2, and I3. For example, assuming the relative RSSI measurements at locations I1, I2 and I3 are, respectively, Y, 2Y and 0.5Y, a point can be determined from which the expected RSSI measurements at locations I1, I2, and I3 would be Y, 2Y, and 0.5Y. In this example, one might estimate the object to be at a location that is, say, one-fourth the distance to location I2 compared to location I1 and four times the distance to location I3 compared to location I1 (e.g., based on a simplistic application of the inverse-square law, although distance for passive/reflective RFID sensors may be more-accurately determined using an inverse-fourth determination because both the signal from the instrument to the sensor and the reflected signal from the sensor back to the instrument are subject to the inverse-square law). For example, the object may be at or near location X indicated in FIG. 15.

In some situations, the distance measurement can be made or supplemented based on the response time between the instrument transmitting the detection signal and the response to that detection signal received by the instrument.

For example, each measurement might produce two or more circles, e.g., one based on RSSI and another based on response time. In some exemplary embodiments, the maximum effective distance can be used to produce one of these circles, for example, to provide a maximum target area in the event that other measurements such as RSSI or response time are not sufficiently accurate. Thus, for example, the circles produced from two successive measurements, each having two circles, conceivably could intersect at zero, one, two, three, four, five, six, seven, or eight points, providing additional candidate locations for the object.

Figure 16:
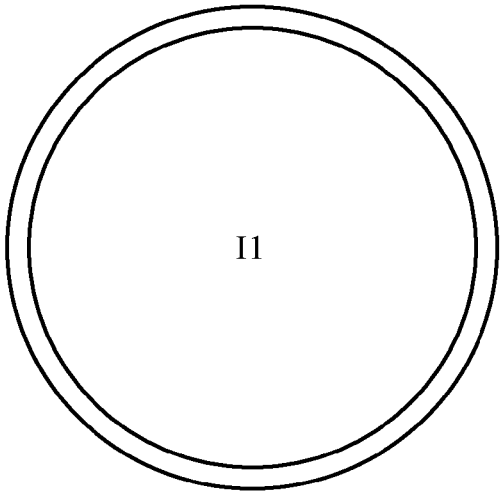
FIG. 16 is a schematic diagram showing a representation of a first measurement producing two circles, in accordance with an exemplary embodiment.

FIG. 16 is a schematic diagram showing a representation of a first measurement producing two circles, in accordance with an exemplary embodiment. For example, one of the circles may be based on RSSI and the other circle may be based on response time.

Figure 17:
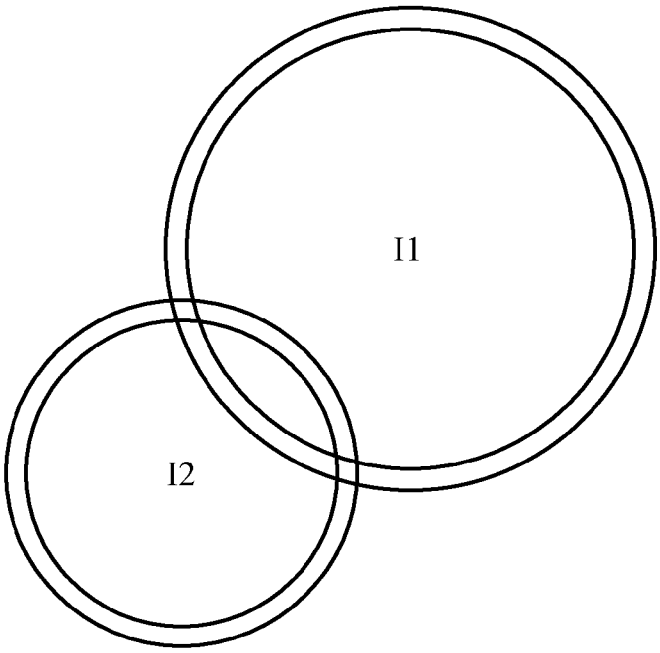
FIG. 17 is a schematic diagram showing a representation of a second measurement producing two circles and eight intersection points, in accordance with an exemplary embodiment.

FIG. 17 is a schematic diagram showing a representation of a second measurement producing two circles and eight intersection points, in accordance with an exemplary embodiment. Additionally or alternatively, distance measurements based on RSSI and response time can be used to determine if a particular measurement produced a useful result. For example, a particular measurement might be discarded if the two distance measurements differ by more than some predetermined amount (e.g., an absolute amount or percentage).

In some cases, distance based on RSSI might be more accurate, while in other cases, distances based on response time might be more accurate. There are many factors than can affect RSSI, such as, for example, the orientation of the sensor antenna relative to the instrument, the location of the sensor on or in the object, the composition of materials between the sensor and the instrument, the battery level of an active sensor, etc. Different sensors can have different transmission characteristics, e.g., two RFID sensors that are equidistant from the instrument could produce different RSSI measurements, thereby appearing to be at different distances from the instrument. The response time also can be affected by various factors, such as, for example, communication errors affecting either the detection signal from the instrument to the sensor (which, in some protocols, is repeated a number of times to better ensure that the detection signal is received by the sensor) or the reply signal from the sensor to the instrument, internal processing times of the sensor, etc. Again, different sensors can have different transmission characteristics, e.g., two RFID sensors that are equidistant from the instrument could produce different response times, thereby appearing to be at different distances from the instrument.

Figure 18:
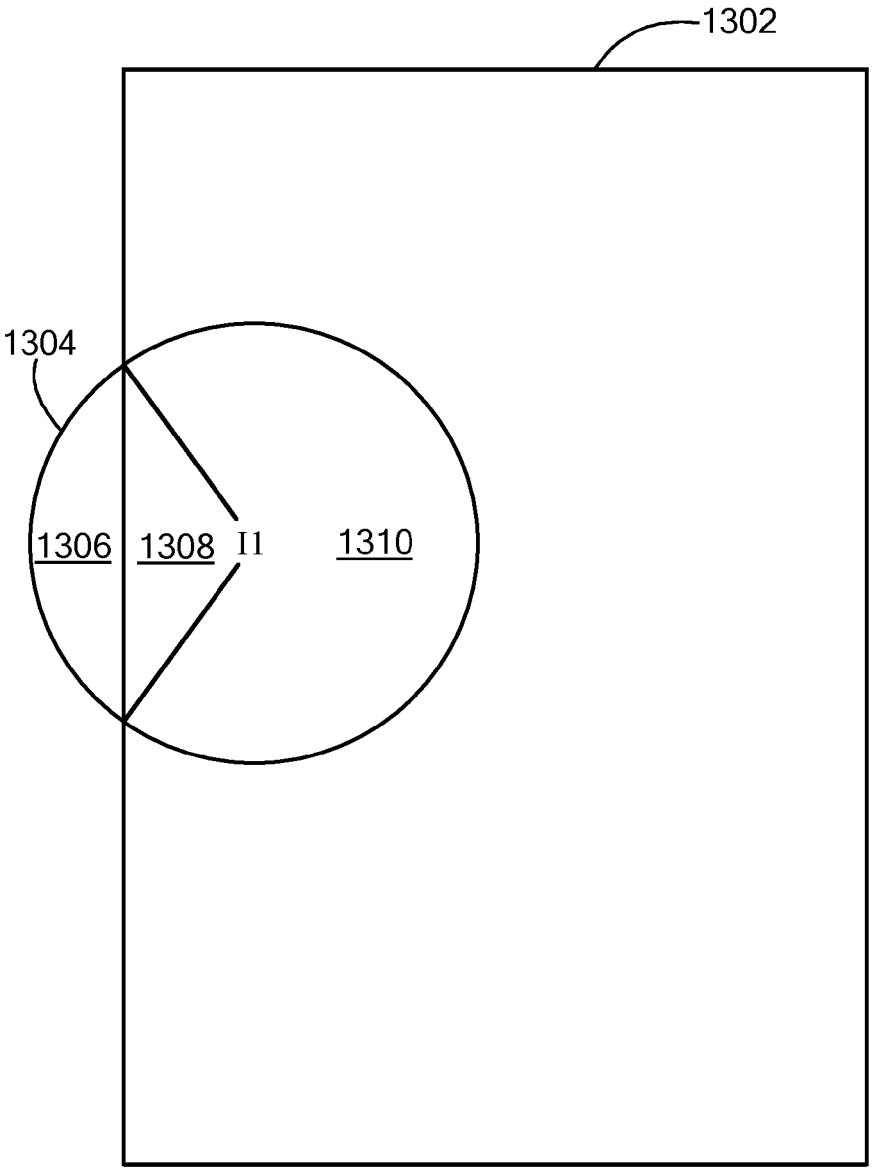
FIG. 18 is a schematic diagram showing how contextual information can be used to limit the area of search for an object, in accordance with an exemplary embodiment.

FIG. 18 is a schematic diagram showing how contextual information can be used to limit the area of search for an object, in accordance with an exemplary embodiment. Here, the storage area is represented by border 1302, which may be physical (e.g., a fence) or virtual. In any case, coordinates for the border 1302 may be stored in a database. A measurement is taken at location I1 and a distance to the object is determined, forming a circle 1304 having a radius equal to the distance to the object. As can be seen, a portion 1306 of the area covered by the circle 1304 falls outside of the storage area, so the object would not be in the area 1306. A portion 1308 of the area covered by the circle 1304 is within the storage area but the points within this area are too close to the instrument and so the object would not be in the area 1308. Rather, the object would be somewhere along the portion of the perimeter of circle 1304 bounding the area 1310. The instrument or other processing device can determine whether, and to what extent, a particular measurement such as the circle 1304 falls within the storage area, for example, by retrieving the coordinates for the storage area and determining an intersection of the storage area with the circle. This determination therefore limits the area of search for the object.

Similarly, as discussed with reference to FIGS. 9-14, in some embodiments, the circle 1304 could represent the maximum effective distance within which the sensor can be detected, in which case the object may be located in a target area covering areas 1308 and 1310. The location of a second measurement can be determined based on this target area rather than on the entire circle, thereby likely reducing the number of measurements needed to identify the location of the object.

It should be noted that the process described with reference to FIG. 5 can be modified in accordance with any of the embodiments described with any of the exemplary embodiments described herein. Thus, for example, the process may determine the location of one or more readings based on the circle(s) produced in one or more prior readings, such as, for example, performing a reading within the area of a prior circle such as discussed with reference to FIGS. 6-8 or determining the location of a reading so as to reduce a target area such as discussed with reference to FIGS. 9-14. Additionally or alternatively, the process may produce multiple circles from a given reading, such as described with reference to FIGS. 16-17. Additionally or alternatively, the process may eliminate certain areas from the location determination such as described with reference to FIG. 18. Depending on the type of sensor used for a particular object, target areas can be determined using any of a variety information (e.g., RSSI, response time, maximum effective distance, etc.) including combinations of such information.

Once an object is located to an acceptable level of accuracy, the location of the instrument may be provided to a user, for example, through a display device associated with the instrument (which may be integral to the instrument or in communication with the instrument such as over a communication network). The location may be provided in any of a variety of formats, such as, for example, location coordinates (e.g., GPS coordinates or other geolocation information), a description of the location (e.g., an aisle number, storage bay number, pallet number, etc.), a map of the location, the distance and direction to the object from a user's location, directions to the object from a user's location, information regarding nearby objects, etc. The location information may be supplemented with one or more images of the object, surrounding objects, location, or other details to further facilitate locating of the object (e.g., photographs, 2D or 3D CAD drawings, images, etc.). Thus, for example, the instrument or other processing device may produce from the location information a graphical interface containing text, images, maps, and/or other information to facilitate locating of the object, e.g., based on information retrieved from a database. Such a graphical interface can be used in other contexts. For example, the location of objects can be recorded as they are stored in the storage area or moved within the storage area (e.g., by "scanning" an object and recording its location), and when a user is attempting to locate a particular object, a relevant graphical interface can be presented in order to facilitate the locating of the object. In any case, historical information can be recorded and later used to assist the user in locating the object.

As will be understood by persons of ordinary skill in the art, the processes described above generally require the ability to identify the location of the instrument at each of the reading locations. This can be done in a variety of ways. For example, the instrument may be able to locate its own position, e.g., via an internal GPS system, WiFi geolocation, video geolocation, inertial sensors, etc. Alternatively, an external system may be used to track the location of the instrument, e.g., via video, WiFi, Bluetooth, etc. The location of the instrument at each reading location typically is recorded and stored, e.g., by the instrument or by an external system. Among other things, this allows each reading received by the instrument to be correlated with the instrument location at which the reading was made.

Thus, for example, the instrument typically includes a computer system (e.g., a microprocessor, memory, and other peripherals) and at least one wireless transceiver capable of communication with the various sensors using one or more protocols (e.g., RFID, BLE, etc.). The computer system of the instrument generally controls a given wireless transceiver to send a detection signal and receive a signal back from a sensor at a plurality of locations. Such readings made by the computer system may be processed on the instrument in order to identify the location of an object. As discussed above, the instrument may determine its own location (e.g., via GPS, WiFi, etc.), or the instrument may receive location information from a remote computer (e.g., to use in processing readings in order to identify the location of an object). Additionally or alternatively, readings and optionally location information made by the instrument may be sent to a remote computer for processing, such as via a network interface of the instrument.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of determining the location of a static object, the static object including a sensor, the method comprising:

positioning an instrument at a first location;

controlling the instrument to transmit a first omnidirectional signal during a first time;

determining a first distance from the instrument to the static object using the first omnidirectional signal;

changing the position of the instrument to a second location;

controlling the instrument to transmit a second omnidirectional signal during a second time;

determining a second distance from the instrument to the static object using the second omnidirectional signal;

changing the position of the instrument to a third location;

controlling the instrument to transmit a third omnidirectional signal during a third time;

determining a third distance from the instrument to the static object using the third omnidirectional signal, the first time being before the second time, the second time being before the third time, using the first, second and third distances to determine the location of the static object.

P2. The method as defined by innovation P1 wherein using comprises using trilateration techniques to determine the location of the static object.

P3. The method as defined by innovation P1 wherein the instrument comprises a mobile device.

P4. The method as defined by innovation P3 wherein the mobile device comprises a portable computer, tablet, or smartphone.

P5. The method as defined by innovation P1 wherein the sensor comprises an RFID sensor.

P6. The method as defined by innovation P1 wherein the first, second and third locations are spaced apart, different locations.

P7. The method as defined by innovation P1 wherein the first, second, and third times are start times and different times.

P8. The method as defined by innovation P1 further comprising:

moving the instrument to a fourth location;

controlling the instrument to transmit a fourth omnidirectional signal during a fourth time;

determining a fourth distance from the instrument to the static object; and using the fourth omnidirectional signal and two of the first, second, and third signals to determine the location of the object.

Although the above discussion discloses various exemplary embodiments of the invention, it should be apparent that those skilled in the art can make various modifications that will achieve some of the advantages of the invention without departing from the true scope of the invention.

What is claimed is:

1. A method of determining the location of an object using an instrument having a wireless [transceiver] *receiver* and a processor, the object including a sensor, the method comprising:

controlling the instrument to make a plurality of [successive] readings at different *reading* locations, wherein, for each reading location, the processor receives, via the wireless [transceiver] *receiver*, a signal from the sensor [and makes a characterization of the received signal using a receive signal strength of the received signal];

determining, by the processor, for each reading location, a circle centered at the reading location and having a radius equal to a maximum effective distance within which the sensor can be detected by the instrument such that all such circles have the same radius;

determining, by the processor, a candidate area for the location of the object based on [an] intersection of the circles; [and]

*making, by the processor, a characterization of at least one of the signals received from the sensor; and* determining, by the processor, [a point within the candidate area based on relative receive signal strength measurements from a plurality of reading locations] *a location within the candidate area based on said characterization*.

2. The method of claim 1, wherein controlling the instrument to make the plurality of [successive] readings at the different *reading* locations comprises:

positioning the instrument at a first location;

[controlling the instrument to transmit a first omnidirectional signal during a first time;]

making a first [characterization for a first signal received from the sensor] *reading* at the first location *at a first time*;

changing the position of the instrument to a second location;

[controlling the instrument to transmit a second omnidirectional signal during a second time;]

making a second [characterization for a second signal received from the sensor] *reading* at the second location *at a second time*;

changing the position of the instrument to a third location; *and*

[controlling the instrument to transmit a third omnidirectional signal during a third time; and]

making a third [characterization for a third signal received from the sensor] *reading* at the third location *at a third time*;

the first time being before the second time, the second time being before the third time.

3. The method of claim 1, wherein the instrument comprises a mobile device.

4. The method of claim 3, wherein the mobile device comprises a portable computer, tablet, or smartphone.

5. The method of claim 1, wherein the instrument is on a movable platform, and wherein controlling the instrument to make a plurality of [successive] readings at [a plurality of] different *reading* locations comprises:

controlling the movable platform to move to the [plurality of] *different reading* locations.

6. The method of claim 1, wherein the sensor comprises an RFID sensor.

7. The method of claim 1, further comprising:

determining whether a sufficient number of readings have been taken for satisfactory location of the object; and upon determining that one or more additional readings are needed, controlling the instrument to make at least one additional reading, each such additional reading being at a different *reading* location than prior readings.

8. The method of claim 7, wherein determining whether a sufficient number of readings have been taken for satisfactory location of the object comprises:

determining whether the candidate area from previous readings is sufficiently small to identify the location of the object.

9. The method of claim 7, wherein:

each additional reading is taken from a different *additional reading* location at which a circle having a radius equal to a maximum effective distance within which the sensor can be detected by the instrument overlaps a portion of the candidate area from previous readings.

10. The method of claim 9, wherein each additional reading is taken from a different *additional reading* location at which a circle having a radius equal to a maximum effective distance within which the sensor can be detected by the instrument overlaps approximately half of the candidate area from previous readings.

11. The method of claim 1, *wherein the instrument includes a wireless transmitter, and* wherein making the plurality of [successive] readings at the different *reading* locations further comprises:

transmitting a detection signal at each of the different *reading* locations via the wireless [transceiver] *transmitter*.

12. The method of claim 1, wherein making the plurality of [successive] readings at the different *reading* locations further comprises:

determining and recording location information for the instrument at each different *reading* location.

13. An instrument for determining the location of an object, the object including a sensor, the instrument comprising:

a wireless [transceiver] *receiver*; and a computer system including a processor and memory storing program code that, when executed by the processor, causes the processor to perform computer processes comprising:

making a plurality of [successive] readings at different *reading* locations, wherein, for each reading location, the processor receives a signal from the sensor via the wireless [transceiver and makes a characterization of the received signal using a receive signal strength of the received signal] *receiver*;

determining, for each reading location, a circle centered at the reading location and having a radius equal to a maximum effective distance within which the sensor can be detected by the instrument such that all such circles have the same radius;

determining a candidate area for the location of the object based on [an] intersection of the circles; [and]

*making a characterization of at least one of the signals received from the sensor, and* determining [a point within the candidate area based on relative receive signal strength measurements from a plurality of reading locations] *a location within the candidate area based on said characterization*.

14. The instrument of claim 13, *further comprising a wireless transmitter,* wherein making the plurality of [successive] readings at the different *reading* locations further comprises:

transmitting a detection signal at each of the different *reading* locations via the wireless [transceiver] *transmitter*.

15. The instrument of claim 13, wherein making the plurality of [successive] readings at the different *reading* locations further comprises:

determining and recording location information for the instrument at each different *reading* location.

16. The instrument of claim 13, *wherein the computer processes* further [comprising] *comprise*:

determining whether a sufficient number of readings have been taken for satisfactory location of the object; and upon determining that one or more additional readings are needed, controlling the instrument to make at least one additional reading, each such additional reading being at a different *reading* location than prior readings.

17. The instrument of claim 16, wherein determining whether a sufficient number of readings have been taken for satisfactory location of the object comprises:

determining whether the candidate area from previous readings is sufficiently small to identify the location of the object.

18. The [method] *instrument* of claim 16, wherein each additional reading is taken from a different *additional reading* location at which a circle having a radius equal to a maximum effective distance within which the sensor can be detected by the instrument overlaps a portion of the candidate area from previous readings.

19. The instrument of claim 18, wherein each additional reading is taken from a different *additional reading* location at which a circle having a radius equal to a maximum effective distance within which the sensor can be detected by the instrument overlaps approximately half of the candidate area from previous readings.

*20. The method of claim 1, wherein the sensor is an active sensor and wherein the signals received from the sensor are actively transmitted signals.*

*21. The method of claim 11, wherein the detection signal is an omnidirectional signal.*

*22. The method of claim 1, wherein the characterization is based on receive signal strength of the at least one received signal.*

*23. The method of claim 1, wherein the characterization is based on response time of the at least one received signal.*

*24. The method of claim 1, wherein determining a location within the candidate area is based on characterizations from a plurality of reading locations.*

*25. The instrument of claim 13, wherein the instrument comprises a mobile device.*

*26. The instrument of claim 25, wherein the mobile device comprises a portable computer, tablet, or smartphone.*

*27. The instrument of claim 13, wherein the sensor is an active sensor and wherein the signals received from the sensor are actively transmitted signals.*

*28. The instrument of claim 14, wherein the detection signal is an omnidirectional signal.*

*29. The instrument of claim 13, wherein the characterization is based on receive signal strength of the at least one received signal.*

*30. The instrument of claim 13, wherein the characterization is based on response time of the at least one received signal.*

*31. The instrument of claim 13, wherein determining a location within the candidate area is based on characterizations from a plurality of reading locations.*

* * * * *